United States Patent
Hagiwara et al.

(10) Patent No.: US 6,844,385 B1
(45) Date of Patent: Jan. 18, 2005

(54) LATEX FOR DIP FORMING AND MOLDED OBJECT OBTAINED BY DIP FORMING

(75) Inventors: Katuo Hagiwara, Kawasaki (JP); Hisanori Ota, Kawasaki (JP)

(73) Assignee: Zeon Corporation, Tokyo (JP)

( * ) Notice: Subject to any disclaimer, the term of this patent is extended or adjusted under 35 U.S.C. 154(b) by 249 days.

(21) Appl. No.: 10/019,232

(22) PCT Filed: Jun. 26, 2000

(86) PCT No.: PCT/JP00/04169

§ 371 (c)(1),
(2), (4) Date: Dec. 28, 2001

(87) PCT Pub. No.: WO01/00726

PCT Pub. Date: Jan. 4, 2001

(30) Foreign Application Priority Data

Jun. 28, 1999 (JP) .......................................... 11-181165
Jun. 28, 1999 (JP) .......................................... 11-182428
Jul. 29, 1999 (JP) .......................................... 11-215284

(51) Int. Cl.[7] .......................... C08K 5/13; C08L 33/02; B28B 1/14; B29C 41/14
(52) U.S. Cl. ...................... 524/323; 524/358; 524/819; 524/820; 524/822; 524/823; 524/824; 264/299
(58) Field of Search ............................... 524/323, 358, 524/819, 820, 822, 823, 824; 264/299

(56) References Cited

U.S. PATENT DOCUMENTS 3,984,609 A * 10/1976 Branlard et al. ............... 526/78
4,436,857 A * 3/1984 Kuan et al. ................. 524/260
5,369,166 A * 11/1994 Ozawa et al. ............... 524/560

FOREIGN PATENT DOCUMENTS

JP  5-247266 A * 9/1993

* cited by examiner

*Primary Examiner*—Tae H. Yoon
(74) *Attorney, Agent, or Firm*—Birch, Stewart, Kolasch & Birch, LLP

(57) ABSTRACT

A latex for dip forming which comprises a copolymer prepared by polymerizing 10 to 90% by weight of a conjugated diene monomer, 0.1 to 20% by weight of an ethylenically unsaturated acid monomer and 10 to 89.9% by weight of other ethylenically unsaturated monomer or monomers copolymerizable therewith, wherein the sum of the amount of acid groups bonded to or adsorbed on the surface of the copolymer constituting the latex and the amount of acid groups present in the aqueous phase of the copolymer latex is in the range of 0.1 to 2 meq. in terms of hydrochloric acid, per gram of the copolymer. This latex is dip-formed to give a dip-formed article having no fear of development of a protein allergy, and exhibiting a soft feeling and a high mechanical strength.

8 Claims, 1 Drawing Sheet

LATEX FOR DIP FORMING AND MOLDED OBJECT OBTAINED BY DIP FORMING

This application is the national phase under 35 U.S.C. § 371 of PCT International Application No. PCT/JP00/04169 which has an International filing date of Jun. 26, 2000, which designated the United States of America.

TECHNICAL FIELD

This invention relates to a dip-formed article, and a latex for dip forming. More particularly, it relates to a dip-formed article which has no fear of development of an allergy to protein, has soft feeling and has a high mechanical strength, and to a latex for dip forming which is used for making the dip-formed article.

BACKGROUND ART

Hitherto, rubber gloves have been made widely by dip-forming a composition comprising a natural rubber latex having incorporated therein a vulcanizer such as sulfur. However, there has been a problem such that, when they are brought into contact with a human body, an allergy reaction develops due to natural proteins contained in natural rubber latex, which causes efflorescence and itching.

Dip-formed articles have also been made by dip-forming a composition comprising a carboxylic acid-modified nitrile copolymer latex such as an acrylic acid-acrylonitrile-butadiene copolymer latex, having incorporated therein zinc oxide as a vulcanizer. The resulting dip-formed articles exhibit enhanced oil resistance and mechanical strength, and thus, are suitable for use in a working area using an organic solvent, but have a problem in that their feeling is rough.

To obviate these problems, there have been proposed a method of dip-forming alternately a natural rubber latex and a carboxylic acid-modified nitrile copolymer latex to superposed rubber layers; and a method of dip-forming a mixed latex of a carboxylic acid-modified nitrile copolymer latex with a carboxylic acid-modified synthetic cis-1,4-polyisoprene rubber latex (Japanese Unexamined Patent Publication No. S53-101036). The former method using a natural rubber latex still has a problem of development of a protein allergy. Both methods use different kinds of latexes, and thus, the production step is complicated and the productivity is low.

DISCLOSURE OF THE INVENTION

In view of the foregoing, a primary object of the present invention is to provide a dip-formed article which has no fear of development of an allergy to protein, has soft feeling and has a high mechanical strength, and to provide a latex for dip forming which is used for making the dip-formed article.

The present inventors made extensive researches to achieve the above-mentioned object, and found that the amount of acid groups present on the surface of a copolymer constituting a latex and the amount of acid groups present in the aqueous phase in the copolymer latex influence the feeling of a dip-formed article. The present invention has been completed based on this finding.

Thus, in accordance with the present invention, there is provided a latex for dip forming characterized in that the latex comprises a copolymer prepared by polymerizing 10 to 90% by weight of a conjugated diene monomer, 0.1 to 20% by weight of an ethylenically unsaturated acid monomer and 10 to 89.9% by weight of other ethylenically unsaturated monomer or monomers copolymerizable therewith, wherein the sum of the amount of acid groups bonded to or adsorbed on the surface of the copolymer constituting the latex and the amount of acid groups present in the aqueous phase of the copolymer latex is in the range of 0.1 to 2 milli-equivalent (hereinafter abbreviated to "meq.") in terms of hydrochloric acid, per gram of the copolymer.

In accordance with the present invention, there is further provided a dip-formed article which is made by dip-forming the above-mentioned latex for dip forming.

BEST MODE FOR CARRYING OUT THE INVENTION

Figure 1:
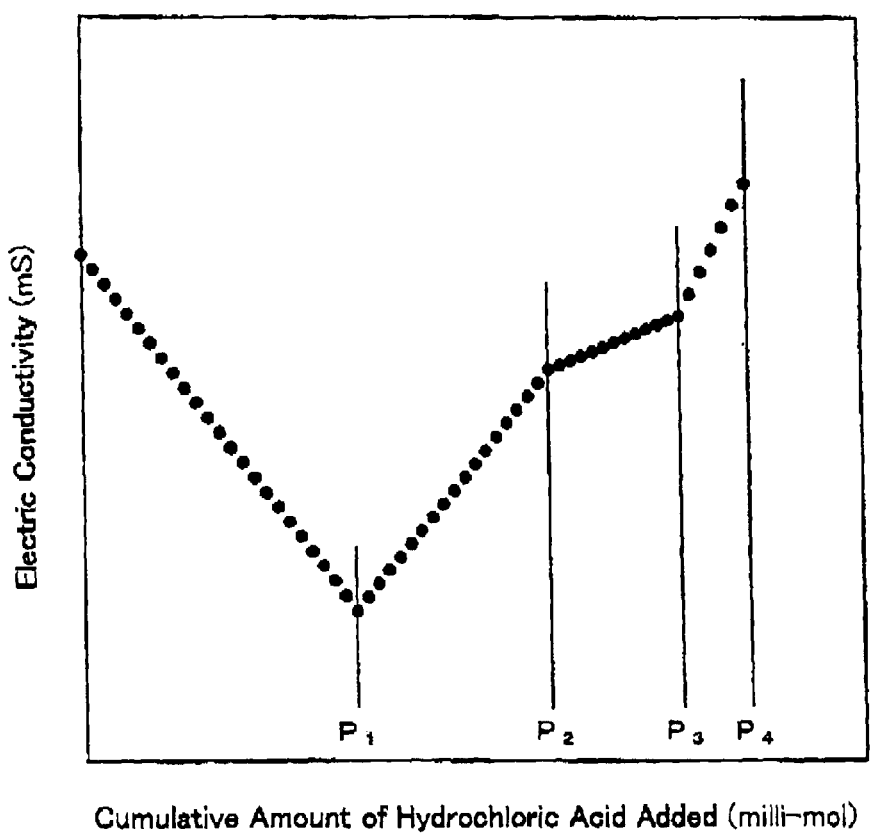
FIG. 1 is a diagram showing the change of electric conductivity of latex depending upon the accumulative amount of hydrochloric acid added.

The dip-forming latex of the present invention is prepared by copolymerization of 10 to 90% by weight of a conjugated diene monomer, 0.1 to 20% by weight of an ethylenically unsaturated acid monomer and 10 to 89.9% by weight of other ethylenically unsaturated monomer or monomers copolymerizable therewith.

The conjugated diene monomer used is not particularly limited, and includes, for example, 1,3-butadiene, isoprene, 2,3-dimethyl-1,3-butadiene, 2-ethyl-1,3-butadiene, 1,3-pentadiene and chloroprene. These conjugated diene monomers may be used either alone or as a combination of at least two thereof.

Of these, 1,3-butadiene and isoprene are preferable. The amount of the conjugated diene monomer is in the range of 10 to 90% by weight, preferably 20 to 80% by weight and more preferably 25 to 75% by weight, based on the total weight of the monomers. When the amount of conjugated diene monomer is too small, the feeling of a glove cannot be obtained. In contrast, when the amount of conjugated diene monomer is too large, the tensile strength and tear strength are reduced and the shapability of a glove becomes poor.

The amount of the conjugated diene monomer may be varied within the above-specified range depending upon the particular kind of other ethylenically unsaturated monomer or monomers used in combination with the conjugated diene monomer. For example, when an ethylenically unsaturated nitrile monomer is used as the other ethylenically unsaturated monomer, the amount of the conjugated diene monomer is preferably in the range of 30 to 90% by weight and more preferably 35 to 80% by weight. When an aromatic vinyl monomer is used as the other ethylenically unsaturated monomer, the amount of the conjugated diene monomer is preferably in the range of 10 to 90% by weight and more preferably 20 to 80% by weight. When the amount of conjugated diene monomer is too small in these cases, the feeling of a dip-formed article becomes rough. In contrast, when the amount of conjugated diene monomer is too large, the tensile strength and tear strength are reduced.

The ethylenically unsaturated acid monomer is not particularly limited provided that it has an acidic group such as, for example, a carboxyl group, a sulfonic acid group or an acid anhydride group. As specific examples of the ethylenically unsaturated acid monomer, there can be mentioned ethylenically unsaturated monocarboxylic acid monomers such as acrylic acid and methacrylic acid; ethylenically unsaturated polycarboxylic acid monomers such as itaconic acid, maleic acid, fumaric acid and butenetricarboxylic acid;

partial ester monomers of ethylenically unsaturated polycarboxylic acids such as monobutyl fumarate, monobutyl maleate and mono-2-hydroypropyl maleate; ethylenically unsaturated polycarboxylic acid anhydride monomers such as maleic anhydride and citraconic anhydride; ethylenically unsaturated sulfonic acid monomers such as styrenesulfonic acid, vinylsulfonic acid, methylvinylsulfonic acid, allylsulfonic acid, methallylsulfonic acid, acrylic acid-2-sulfonic acid ethyl, methacrylic acid-2-sulfonic acid ethyl, and 2-acrylamide-2-hydroxypropanesulfonic acid; ethylenically unsaturated phosphoric acid monomers such as acrylic acid-3-chloro-2-phosphoric acid propyl, methacrylic acid-3-chloro-2-phosphoric acid propyl, acrylic acid-2-phosphoric acid ethyl, methacrylic acid-2-phosphoric acid ethyl and 3-allyloxy-2-hydroxypropanephosphoric acid. These monomers may be used in the form of an alkali metal salt or an ammonium salt. These monomers may also be used either alone or as a combination of at least two thereof. Of these, ethylenically unsaturated monocarboxylic acids are preferable because the resulting dip-formed article has well balanced feeling and tensile strength. Methacrylic acid is especially preferable.

The amount of the ethylenically unsaturated acid monomer is in the range of 0.1 to 20% by weight, preferably 1 to 15% by weight and more preferably 2 to 10% by weight, based on the total weight of the monomers. When the amount of the ethylenically unsaturated acid monomer is smaller 0.1% by weight, the tensile strength of a dip-formed article is reduced. In contrast, when the amount of the ethylenically unsaturated acid monomer is larger 20% by weight, the tear strength of a dip-formed article is reduced and the feeling thereof becomes rough.

The other ethylenically unsaturated monomer used includes, for example, ethylenically unsaturated nitrile monomers, aromatic vinyl monomers, ethylenically unsaturated acid derivative monomers and crosslinking monomers. The kind and amount of these monomers may appropriately be varied depending upon various properties such as feeling, oil resistance and mechanical strength required for the object dip-formed article. Ethylenically unsaturated nitrile monomers are preferable because of excellent oil resistance.

The ethylenically unsaturated nitrile monomers are not particularly limited, and, as specific examples thereof, there can be mentioned acrylonitrile, methacrylonitrile, fumaronitrile, α-chloracrylonitrile and α-cyanoethylacrylonitrie. Of these, acrylonitrile is preferably used. The amount of the ethylenically unsaturated nitrile monomers may appropriately be varied depending upon the properties required for the objective dip-formed article. The amount of the ethylenically unsaturated nitrile monomers is preferably in the range of 9 to 50% by weight and more preferably 20 to 45% by weight, based on the total weight of the monomers. When the amount of the ethylenically unsaturated nitrile monomer is too small, the oil resistance of a dip-formed article becomes poor. In contrast, when the amount of the ethylenically unsaturated nitrile monomer is too large, the feeling of a dip-formed article becomes rough.

As specific examples of the aromatic vinyl monomer, there can be mentioned styrene, methylstyrene, vinyltoluene, chlorostyrene and hydroxymethylstyrene. Of these, styrene is preferable. The amount of the aromatic vinyl monomers may appropriately be varied depending upon the properties required for the objective dip-formed article. The amount of the aromatic vinyl monomers is usually in the range of 10 to 89.9% by weight and preferably 20 to 80% by weight, based on the total weight of the monomers. When the amount of the aromatic vinyl monomer is too small, the feeling of a dip-formed article becomes extremely soft. In contrast, when the amount of the aromatic vinyl monomer is too large, the feeling of a dip-formed article becomes rough.

The ethylenically unsaturated acid derivative monomers include, for example, ethylenically unsaturated acid ester monomers and ethylenically unsaturated acid amide monomers. The ethylenically unsaturated acid ester monomers are esters of an ethylenically unsaturated monocarboxylic acid or an ethylenically unsaturated polycarboxylic acid with an alcohol which may have a substituent such as halogen. As specific examples of the ethylenically unsaturated acid derivative monomers, there can be mentioned acrylic acid esters and methacrylic acid esters such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, trifluoroethyl acrylate, trifluoroethyl methacrylate, tetrafluoropropyl acrylate, tetrafluoropropyl methacrylate, methoxymethyl acrylate, methoxymethyl methacrylate, ethoxymethyl acrylate, ethoxymethyl methacrylate, methoxyethoxyethyl acrylate, methoxyethoxyethyl methacrylate, cyanomethyl acrylate, cyanomethyl methacrylate, 2-cyanoethyl acrylate, 2-cyanoethyl methacrylate, 1-cyanopropyl acrylate, 1-cyanopropyl methacrylate, 2-ethyl-6-cyanohexyl acrylate, 2-ethyl-6-cyanohexyl methacrylate, 3-cyanopropyl acrylate, 3-cyanopropyl methacrylate, hydroxyethyl acrylate, hydroxyethyl methacrylate, hydroxypropyl acrylate, hydroxypropyl methacrylate, glycidyl acrylate, glycidyl methacrylate, N,N-dimethylaminoethyl acrylate and N,N-dimethylaminoethyl methacrylate; and polycarboxylic acid esters such as dibutyl maleate, dibutyl fumalate and diethyl maleate.

As specific examples of the ethylenically unsaturated acid amide monomers, there can be mentioned acrylamide and methacrylamide monomers such as acrylamide, methacrylamide, N-methylolacrylamide, N-methylolmethacrylamide, N,N-dimethylolacrylamide, N,N-dimethylolmethacrylamide, N-methoxymethylacrylamide, N-methoxymethylmethacrylamide, N-propoxymethylacrylamide and N-propoxymethylmethacrylamide.

As specific examples of the crosslinking monomers, there can be mentioned conjugated divinyl compounds such as divinylbenzene; and polyacrylate compounds and polymethacrylate compounds such as polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, pentaerythritol acrylate and pentaerythritol methacrylate.

In the dip-forming latex of the present invention, the sum of the amount of acid groups bonded to or adsorbed on the surface of the copolymer constituting the latex and the amount of acid groups present in the aqueous phase of the latex is in the range of 0.1 to 2 milli-equivalent (meq.) preferably 0.15 to 1.8 meq., in terms of hydrochloric acid, per g of the copolymer. When the sum of the acid groups is smaller than 0.1 meq., the resulting glove is not crosslinked to the desired extent and its tear strength becomes poor. Further, the colloid stability of latex become poor and thus, when a crosslinker or other ingredients are incorporated, coagulation sometimes occur. In contrast, when the sum of the acid groups is larger than 2 meq., the content of hydrophilic ingredients is undesirably large and, when a glove is immersed in water, the strength thereof tends to be reduced.

The method for controlling the total amount of acid groups within the above-specified range is not particularly limited, but, usually the total amount of acid groups can be controlled by a method of choosing the kind and amount of ethylenically unsaturated acid monomers for copolymerization, and the time at which the monomers are added to a polymerization system. In addition to these methods, a method of choosing the kind and amount of an emulsifier and a polymerization initiator, and a method of adjusting the pH value of a polymerization system can also be employed.

To provide a glove having a uniform thickness, the dip-forming latex of the present invention preferably has chemical stability index values CS1 and CS2 satisfying the following formulae (1):

$$1.5\% \leq CS2, \text{ and } CS1 \leq 3.0\% \quad (1)$$

wherein CS1 is a value of the minimum concentration of a NaCl solution at which a latex having a solid content of 5% by weight can be coagulated. CS1 is measured by a method wherein a plurality of NaCl solutions having different concentrations increasing stepwise by 0.1% by weight are prepared, 30 ml of each NaCl solution was placed in a beaker having a volume of 100 ml, and one drop (about 0.2 $cm^3$) of a latex having a solid content of 5% by weight is dropwise added to each NaCl solution in a beaker. CS1 is defined as the minimum concentration of a NaCl solution at which the drop of latex is capable of being coagulated.

CS2 is a value of the minimum concentration of a NaCl solution at which a latex having a solid content of 45% by weight can be coagulated. CS2 is measured by a method wherein a plurality of NaCl solutions having different concentrations increasing stepwise by 0.1% by weight are prepared, 30 ml of each NaCl solution was placed in a beaker having a volume of 100 ml, and one drop (about 0.2 $cm^3$) of a latex having a solid content of 45% by weight is dropwise added to each NaCl solution in a beaker. CS2 is defined as the minimum concentration of a NaCl solution at which the drop of latex is capable of being coagulated.

When CS2 value decreases, the chemical stability of latex is reduced, and a coagulum tends to be produced at a step of adding zinc oxide or a sulfur dispersion, and the dip forming property is deteriorated with the result of reduction of uniformity in film thickness. When CS1 value increases, the chemical stability increases and the film-forming property is deteriorated, and, when a mold is taken out after dipping in a latex, a coating of the latex is not coagulated and flows down with the result of also reduction of uniformity in film thickness.

The method of controlling the chemical stability of latex is not particularly limited. For example, the chemical stability of latex can be varied by choosing the amount of an ethylenically unsaturated acid monomer in the monomer mixture, or the amount of an emulsifier used for polymerization of the monomer mixture, or controlling pH of a copolymer latex.

The dip-forming latex of the present invention is usually prepared by an ordinary emulsion polymerization procedure. The temperature for emulsion polymerization is usually in the range of 0 to 100° C. When the emulsion polymerization is carried out at a temperature not higher than 45° C., a dip-formed article having high mechanical strength and good feeling can be easily obtained. The manner in which the monomer mixture is added is not particularly limited. For example, the monomer mixture is added in a lot or continuously in a polymerization reactor, or a part of the monomer mixture is charged in a polymerization reactor and then the remaining part is continuously added.

The polymerization initiator used for polymerization is not particularly limited, and, as specific examples thereof, there can be mentioned inorganic peroxides such as sodium persulfate, potassium persulfate, ammonium persulfate, potassium perphosphate and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyril peroxide and benzoyl peroxide; and azo compounds such as azobisisobutyronitrile, azobis-2,4-dimethylvarelonitrile and methyl azobisisobutyrate. These polymerization initiators may be used either alone or as a combination of at least two thereof. Of these, peroxide initiators are preferable because a copolymer latex can be stably produced and a dip-formed article having high mechanical strength and soft feeling can be obtained. The amount of polymerization initiator is varied to some extent depending upon the particular kind of initiator, but is preferably in the range of 0.01 to 0.6% by weight based on the monomer mixture.

A redox polymerization initiator may also be used which is a combination of a peroxide initiator with a reducing agent. As specific examples of the reducing agent used, there can be mentioned compounds having a metal ion of a reduced state such as ferrous sulfate and cuprous naphthenate; sulfonic acid compounds such as sodium methanesulfonate; and amine compounds such as diemthylaniline. These reducing agents may be used either alone or as a combination of at least two thereof. The amount of reducing agent is varied to some extent depending upon the particular kind of reducing agent, but is preferably in the range of 0.03 to 10 parts by weight per part by weight of the peroxide.

Of the above-recited initiators, a redox polymerization initiator comprising a combination of a peroxide initiator with a reducing agent is especially preferable.

The emulsifier used for polymerization also is not particularly limited, and, as specific examples thereof, there can be mentioned nonionic emulsifiers such as polyoxyethylene alkyl ether, polyoxyethylene alkyl phenyl ether, polyoxyethylene alkyl ester and polyoxyethylene sorbitan alkyl ether; anionic emulsifiers which include fatty acids such as myristic acid, palmitic acid, oleic acid and linolenic acid, and salts thereof, higher alcohol sulfate ester, alkylsulfosuccinic acid, alkylbenzenesulfonate salts and aliphatic sulfonic acid salts; cationic emulsifiers which include ammonium chlorides such as trimethylammonium chloride and dialkylammonium chloride, benzylammonium salts, and quaternary ammonium salts; and copolymerizing emulsifiers such as sulfo-esters of α,β-unsaturated carboxylic acid, sulfate esters of α,β-unsaturated carboxylic acid and sulfoalkyl aryl ethers thereof. Of these, anionic emulsifiers and nonionic emulsifiers are preferable. These emulsifiers may be used either alone or as a combination of at least two thereof. The amount of emulsifier is usually in the range of 0.1 to 9% by weight based on the monomer mixtures.

According to the need, polymerization auxiliaries such as a molecular weight modifier, a particle size modifier, an antioxidant, a chelating agent and an oxygen scavenger can be used at polymerization.

The polymerization is carried out usually until a conversion of at least 90%, preferably at least 95% and more preferably at least 99% is reached. The obtained copolymer latex usually has a particle diameter in the range of 0.07 to 0.3 μm, preferably 0.08 to 0.2 μm. When the particle diameter is too small, the viscosity of latex is too high, and the latex becomes difficult to handle and the compounding stability becomes poor. In contrast, when the particle diameter is too high, the film-forming property of latex is reduced.

The dip-forming latex of the present invention preferably contain a phenolic compound having a function of radical chain termination as an antioxidant. The phenolic compound does not contaminate a dip-formed article, exudes a smell only to a minor extent, and, even when the dip-formed article is subjected to a chlorination treatment in the after-treatment step, it is not subject to pink staining, namely, the dip-formed article exhibits good resistance to pinking. Note, the chlorination treatment is a method of providing a slip finish on a dip-formed article so that the closely contacted inner surfaces thereof do not stick to each other.

Instead of the phenolic compound, an aromatic amine compound can also be used. But, an aromatic amine compound tends to contaminate a dip-formed article and is liable to exude a smell. A compound exhibiting a function of peroxide decomposition can also be used as an antioxidant, but, this compound causes yellow discoloration due to heat and ultraviolet rays, and its antioxidation effect is minor with a single use thereof.

The phenolic compound includes monophenol compounds, bis-, tris- and polyphenol compounds, and thiobisphenol compounds. As specific examples thereof, there can be mentioned monophenol compounds such as 2,6-di-t-butylphenol, 2,6-di-t-butyl-4-methylphenol, 2,4-dioctylphenol, butylhydroxyphenol, 2,6-di-t-butyl-α-dimethylamino-p-cresol, and butylated and octylated phenol; bis-, tris- and polyphenol compounds, such as 2,2'-methylene-bis(6-α-methyl-benzyl-p-cresol), 4,4'-butylidene-bis(3-methyl-6-t-butylphenol), 2,2'-methylene-bis(4-methyl-6-t-butylphenol), a butylated reaction product of p-cresol with dicyclopentadiene, 1,3,5-trimethyl-2,4,6-tris(3,5-di-t-butyl-4-hydroxybenzyl)benzene and modified polyalkylphosphited polyphenol; and thiobisphenol compounds such as 4,4'-thiobis-(6-t-butyl-3-methylphenol) and 4,4'-thiobis-(6-t-butyl-o-cresol).

Among the phenolic compounds, preferable are those which are solid at room temperature and have a melting point which is lower than the highest temperature to which the copolymer is exposed in the course of producing a dip-formed article. Usually the highest temperature to which the copolymer is exposed in the course of production of a dip-formed article is about 120° C. If an antioxidant is liquid at room temperature, the antioxidant exudes a smell. If an antioxidant has a melting point higher than 120° C., the antioxidant is not melted at the step of dip-forming, and thus, the antioxidant is not homogeneously infiltrated in the dip formed article. In consideration of these characteristics, 2,6-di-t-butyl-4-methylphenol and a butylated reaction product of p-cresol with dicyclopentadiene are especially preferably used.

The amount of antioxidant can be determined depending upon the properties required for the objective dip formed article, but is preferably in the range of 0.1 to 3 parts by weight, and more preferably 0.3 to 1 part by weight, based on 100 parts by weight of the solid content of latex. If the amount of antioxidant is too small, heat discoloration and UV discoloration are liable to occur, and the mechanical strength tends to be reduced. In contrast, if the amount of antioxidant is too large, the effect of improving the resistance to heat discoloration and the resistance to light coloration, and enhancing the mechanical strength retention is reduced.

The method by which the antioxidant is added is not particularly limited, but, usually, in view of ease in mixing with a latex, the antioxidant is added in a form of liquid dispersion such as an emulsion or a dispersion. The liquid dispersion is prepared usually by an emulsifying method or a pulverizing method.

The emulsifying method comprises thoroughly stirring at a high rate an antioxidant, which is liquefied by heating, if desired, an emulsifier and warm water. As water is used as a liquid medium, an antioxidant having a melting point not higher than 100° C. (i.e., boiling point of water), preferably not higher than 90° C. is usually used.

The pulverizing method comprises finely dividing by mechanical means a solid antioxidant having a melting point which is too high to be subjected to an emulsifying treatment, whereby a dispersion is formed. The pulverizing method includes a dry pulverization method using, for example, a turbo mill or a jet mill, and a wet pulverization method using, for example, a colloid mill. A wet pulverization method is preferable because a finer particle diameter can be obtained and heat generation at pulverization is smaller. Of the wet pulverization method, a media-type wet pulverization method is preferable. The media-type wet pulverization method includes those wherein a ball mill, a high-speed bead mill or other mill is used. Of these, the media-type wet pulverization method using a high-speed bead mill is especially preferable.

In the media-type wet pulverization method using a high-speed bead mill, a cylindrical vessel charged with spherical media is rotated at a high speed by using an agitator shaft. An antioxidant is fed into the moving media within the vessel by using a pump. Thus pulverization is effected in a batchwise or continuous manner. As the media, small size beads usually having a particle diameter of at least 0.5 mm, preferably in the range of 0.5 to 10 mm and more preferably 0.5 mm to 3 mm are used. The beads usually have a density of at least 2 g/cm$^3$. The beads are preferably composed of ceramics with high hardness such as zirconia, or a metal with high hardness such as steel. The amount of beads charged in a vessel is preferably in the range of 60 to 95% and more preferably 70 to 85%.

The dip formed article of the present invention is made by dip forming the above-mentioned dip-forming latex by an ordinary procedure. Usually a form is dipped in a bath of dip-forming liquid formulation whereby a layer of a latex is deposited on the surface of the form, and then the form having the latex layer is taken out from the bath and then the latex layer is dried. As specific examples of the dip forming method, there can be mentioned a direct dipping method, an anode coagulation dipping method, and a teague coagulation dipping method.

The dip-forming liquid formulation usually comprises a dip-forming latex, and ingredients such as a vulcanizer (crosslinking agent), a vulcanization auxiliary for crosslinking the latex with a metal ion, a vulcanization accelerator, and a base as pH adjuster. The dip-forming latex of the present invention may be used either alone or as a combination of at least two thereof. Other latexes can be used in combination with the latex of the present invention provided that the object of the present invention can be achieved.

In the present invention, sulfur or sulfur-containing compounds are used as a crosslinking agent. The amount of the crosslinking agent is usually in the range of 0.3 to 5 parts by weight, preferably 0.5 to 3 parts by weight, based on 100 parts by weight of the solid content in the latex. To more enhance the mechanical strength, a metal oxide such as zinc oxide, magnesium oxide or lead oxide can be added. Of these zinc oxide is especially preferable. The amount of the metal oxide is usually in the range of 0.1 to 5 parts by weight, preferably 0.5 to 3 parts by weight, based on 100 parts by weight of the solid content in the latex. When the amount of metal oxide is too small, the mechanical strength is poor. In contrast, when the amount of metal oxide is too large, the effect of mechanical strength improvement is not enhanced and the cost performance is reduced. Crosslinking can be effected only with the use of the metal oxide, but the crosslinked product is liable to have a rough feeling. Therefore, the metal oxide is preferably used in combination with sulfur to thereby form a sulfur crosslink as well as a metal crosslink.

In the dip forming, a form must be treated with a coagulating agent before or after the form is dipped in a dip-forming liquid formulation. The method of treating a form with a coagulating agent includes, for example, a method of dipping a form in a solution of a coagulating agent prior to dipping in the dip-forming liquid formulation whereby the coagulating agent is deposited on the form, and a method of applying a solution of a coagulating agent onto a form having deposited thereon a latex. As the coagulating agent, for example, a polyvalent metal salts such as calcium nitrate and calcium chloride are used.

After the form having deposited thereon the latex is taken out from the dip-forming liquid formulation, the form is subjected to a warm water treatment or a heat treatment whereby unreacted monomers and excessive ingredients are removed and a crosslinking reaction of copolymer is promoted. The method for heat treatment or warm water treatment is not particularly limited, and, as specific examples thereof, there can be mentioned a method of dipping the latex-deposited form in a warm water bath, a method of blowing warm air against the latex-deposited form, and a method of irradiating the latex-deposited form with infrared rays.

By the above-mentioned methods, a dip-formed article of the present invention is made. The shape of the dip-formed article is not particularly limited, and includes, for example, a fingerstall, a thin-gage glove, a medium-gage glove, a supported glove, a nipple for nursing bottle, a squirt, a water-pillow, a catheter, a balloon, a toy balloon and a doll. The dip-forming latex of the present invention is especially useful for a thin-gage glove having a wall-thickness of 0.1 mm to 0.3 mm. This thin-gage glove has no fear of development of an allergy to protein, has soft feeling and has a high mechanical strength, and therefore, the glove is especially suitable for surgical operation and diagnosis.

If desired, the surface of the dip formed article of the present invention can be coated with finely divided inorganic particles such as talc particles or calcium carbonate particles; starch powder; finely divided organic particles such as polystyrene particles; or silicone oil.

The invention will now be described by the following working examples that by no means limit the scope of the invention.

Parts and percents in examples and comparative examples are by weight unless otherwise specified. The weight of a latex is expressed in terms of the weight of the solid content.

Properties of latexes and dip-formed articles were evaluated by the following methods.

(1) Total Amount of Acid Groups per Gram of Copolymer Latex

The total amount of acid groups in a copolymer latex is determined by measuring the change of electrical conductivity of the copolymer latex as observed when hydrochloric acid is added to the latex according to the method for measurement of the amount of acid groups present on the surface of the copolymer and the amount of acid groups present in the aqueous phase of the copolymer latex. The change of electrical conductivity depending upon the amount of hydrochloric acid added is illustrated in FIG. 1.

A glass vessel having an inner volume of 150 ml is washed with distilled water, and 50 g of a copolymer latex having a solid content of 2% is placed in the glass vessel. The vessel is set to an electric conductivity meter (CM-117 available from Kyoto Denshi Kogyo K.K., type of cell: K-121). The content of the vessel is stirred and the stirring is continued until the addition of hydrochloric acid is completed. 0.1 N aqueous solution of sodium hydroxide (special grade reagent, available from Wako Pure Chem. Ind., Ltd.) is added, and, when 6 minutes elapse from the addition of sodium hydroxide, electric conductivity is measured. The electric conductivity is herein called as an electric conductivity at the commencement of measurement. Then 0.5 ml of 0.1 N aqueous hydrochloric acid (special grade reagent, available from Wako Pure Chem. Ind., Ltd.) is added to the copolymer latex so that the electric conductivity of the latex is in the range of 2.5 to 3.0 (mS), and, 30 seconds after, electric conductivity is measured. This procedure of addition of 0.1 N hydrochloric acid and measurement of electric conductivity is repeated at an interval of 30 seconds until the electric conductivity value reaches the electric conductivity at the commencement of measurement.

The data of the electric conductivity values obtained are plotted in a graph in X-Y coordinate system with an ordinate expressing electric conductivity (mS) and an abscissa expressing cumulative amount (milli-mol) of hydrochloric acid added. Thus, a hydrochloric acid amount/electric conductivity line having three inflection points is drawn as illustrated in FIG. 3. The X coordinate values for cumulative amount of hydrochloric acid at the three inflection points and the point at the completion of hydrochloric acid addition are referred to as $P_1$, $P_2$, $P_3$ and $P_4$, in the order of increasing magnitude. As for the data in the four segments, namely, first segment spanning from 0 to $P_1$, second segment spanning from $P_1$ to $P_2$, third segment spanning from $P_2$ to $P_3$ and fourth segment spanning from $P_3$ to $P_4$, corresponding approximate lines $L_1$, $L_2$, $L_3$ and $L_4$ are obtained by the method of least squares. An X coordinate value for an intersection point of $L_1$ and $L_2$, an X coordinate value for an intersection point of $L_2$ and $L_3$, and an X coordinate value for an intersection point of $L_3$ and $L_4$ are referred to $A_1$(milli-mol), $A_2$(milli-mol) and $A_3$(milli-mol), respectively.

The amount of acid groups present on the surface of the copolymer per g of the copolymer, and the amount of acid groups present in the aqueous phase of the copolymer latex per g of the copolymer are obtained, in terms of amount (milli-equivalent [meq.]) of hydrochloric acid, from the following formulae (a) and (b), respectively.

(a) Amount of acid groups on the surface of copolymer per gram of copolymer=$A_2-A_1$ (b) Amount of acid groups in the aqueous phase of latex per gram of copolymer=$A_3-A_2$ Therefore, the total amount of acid groups per gram of copolymer latex is the sum of (a) plus (b), as expressed by the formula (c).

(c) Total amount of acid groups per gram of copolymer latex=(a)+(b)(c)

(2) Feeling

A dumbbell specimen is cut out from a dip formed article by a dumbbell die No. 2 (small size). Tensile strength at an elongation of 300% is measured at a grip separation rate of 500 mm/min. The smaller the value for tensile strength at 300% elongation, the softer the feeling (3) Tensile Strength The above-mentioned dumbbell specimen is drawn at a grip separation rate of 500 mm/min, and tensile strength is measured immediately before breaking.

(4) Tensile Strength after Immersion in Water

The above-mentioned dumbbell specimen is immersed in water for 3 hours, and then water is wiped away therefrom. Then the specimen is drawn at a grip separation rate of 500 mm/min, and tensile strength is measured immediately before breaking.

(5) CS Value

A plurality of aqueous NaCl solutions having different concentrations increasing stepwise by 0.1% by weight are prepared. 30 ml of each aqueous NaCl solution was placed in a beaker having a volume of 100 ml, and one drop (about 0.2 cm$^3$) of a latex is dropwise added to each aqueous NaCl solution in the beaker. The CS value is defined as the minimum concentration of the aqueous NaCl solution at which the drop of latex is coagulated. The measurement is carried out by using two latexes having different solid concentrations (i.e., solid concentrations of 5% and 45%). The CS values for the two latexes having a concentration of 5% and 45% are referred to CS1 value and CS2 value, respectively. The latex having a solid concentration of 5% is prepared by diluting the latex having a solid concentration of 45% with soft water.

(6) Film-Forming Property

A solid film layer of a latex is formed on the surface of a glove form and then the thus-formed dip-formed article having a glove shape is stripped from the glove form. The state and appearance of the stripped glove are observed, and evaluated according to the following three ratings.

Rating a: Continuous film having good uniformity is formed over the entire glove Rating b: Continuous film having partially non-uniformity is formed Rating c: Non-continuous film having cracks and holes is formed (7) Film Thickness and Monodisperse Ratio A line is drawn on a dip-formed article, and film thickness is measured at 20 points on the line. Average film thickness and standard deviation are calculated. The film thickness is expressed by the average thickness, and the monodisperse ratio of the film thickness is expressed by the ratio in percent obtained by dividing the standard deviation by the average film thickness. The smaller the monodisperse ratio, the better the uniformity of film thickness.

(8) Oil Resistance

A circular specimen having a diameter of 20 mm is cut out from a dip-formed article. The specimen is immersed in predetermined oil at 25° C. for 48 hours. The area of the immersed specimen is measured. The oil resistance is expressed by the areal swelling ratio (%) as defined by the value (%) obtained by dividing the difference between the area before immersion and the area after immersion by the area before immersion. The smaller the obtained value, the better the oil resistance.

(9) Heat Discoloration Resistance

A specimen of a dip-formed article is placed in an oven, and is maintained at 160° C. for 10 minutes in an air atmosphere. Then yellow index (Y.I.) is measured by a differential colorimeter (available from Suga Shikenki K.K.). The smaller the Y.I. value, the better the heat discoloration resistance.

(10) Light Discoloration Resistance A specimen of a dip-formed article is irradiated with ultraviolet rays at 63° C. for 16 hours in an air atmosphere by using a light resistance tester (long life type, available from Suga Shikenki K.K.). Then yellow index (Y.I.) is measured by a differential calorimeter. The smaller the Y.I. value, the better the heat discoloration resistance.

(11) Pinking Resistance

A free chlorine solution is prepared by mixing 99 parts of an aqueous 5% sodium hypochlorite solution and 1 part of conc. hydrochloric acid. A dip-formed article is immersed in the free chlorine solution for 48 hours. Then the specimen is taken out and washed with an aqueous 2% ammonia solution and further with water. The washed specimen is dried by a tumbler at 50° C. The reddishness (a* value) of the dried specimen is measured by a differential calorimeter. The smaller the a* value, the better the pinking resistance.

EXAMPLE 1

The atmosphere within a polymerization reactor is replaced with nitrogen, and the polymerization reactor was charged with 34 parts of acrylonitrile, 59 parts of 1,3-butadiene, 7 parts of methacrylic acid, 0.5 part of a molecular weight modifier (TDM: t-dodecyl mercaptan), 150 parts of soft water, 2.5 parts of an emulsifier (sodium dodecylbenezenesulfonate), 0.2 part of an initiator (potassium persulfate) and 0.1 part of a reducing agent (ethylenediaminetetraacetic acid). Polymerization was carried out for 20 hours while the temperature was maintained at 30° C., and then a short-stopper was added to complete the polymerization.

Unreacted monomers were removed from the thus-obtained copolymer latex, and pH and concentration of the latex were adjusted to give a copolymer latex A having a solid concentration of 45% and a pH value of 8.3. Properties of the latex are shown in Table 1.

1.0 part of sulfur, 1.0 part of zinc oxide, 1.0 part of titanium oxide, 0.03 part of potassium hydroxide and 3.2 part of water were mixed together to give a liquid dispersion of vulcanizer having a solid concentration of 50%. 7 parts of the liquid dispersion of vulcanizer was mixed together with 220 parts of latex A having a solid concentration of 45% to give a dip-forming liquid formulation.

20 parts of calcium nitrate, 0.05 part of a nonionic emulsifier ("Emulgen-810"™ available from Kao Corporation) and 80 parts of water were mixed together to give a coagulating solution having a solid concentration of 20%. A glove form was dipped in the coagulating solution for 1 minute, and then taken out from the coagulating solution. Then the glove form was dried at 20° C. for 3 minutes whereby a coagulant was deposited on the glove form. The glove form having a coagulant deposited thereon was dipped in the above-mentioned dip-forming liquid formulation for 6 minutes, taken out from the liquid formulation, and then dried at 20° C. for 3 minutes. The glove form was further dried at 8° C. for 20 minutes in a drier, and then heat-treated at 120° C. for 25 minutes to form a solid film layer on the glove form. Finally the solid film layer was stripped from the glove form to obtain a dip-formed article of a glove shape. The evaluation results of the dip-formed article are shown in Table 1.

EXAMPLES 2–4, COMPARATIVE EXAMPLES 1–3

The procedures for preparing copolymer latex A, described in Example 1, were repeated wherein the monomer composition was varied as shown in Table 1 with all other conditions remaining the same. Thus copolymer latexes B through G each having a solid concentration of 45% and a pH value of 8.3 were prepared. Properties of these latexes are shown in Table 1.

By the same procedures as described in Example 1, dip-formed articles were made wherein latexes B through G were used instead of latex A. The evaluation results of the dip-formed articles are shown in Table 1.

From the results shown in Table 1, dip-formed articles made from the copolymer latexes of the present invention in Examples 1 to 4 have a soft feeling and high tensile strength and tensile strength after immersion in water. In contrast, when latex E having a small total acid group content is used, the resulting dip-formed article has a soft feeling, but its tensile strength and tensile strength after immersion in water are low (Comparative Example 1). When latex F and Latex G, which have a large total acid group content, are used, the resulting dip-formed articles have a high tensile strength, but their feeling is rough and their tensile strength after immersion in water is low (Comparative Examples 2 and 3).

TABLE 1

| Example No. | Example | | | | Comparative Ex. | | |
|---|---|---|---|---|---|---|---|
| | 1 | 2 | 3 | 4 | 1 | 2 | 3 |
| Monomers (parts) | | | | | | | |
| Acrylonitrile | 34 | — | 45 | — | — | 20 | 25 |
| Styrene | — | 20 | — | 50 | 50 | — | — |
| 1,3-Butadiene | 59 | 65 | 50 | 48 | 50 | 50 | 60 |
| Methacrylic acid | 7 | 15 | — | — | — | 30 | 5 |
| Acrylic acid | — | — | 5 | 2 | — | — | 10 |
| Latex | A | B | C | D | E | F | G |
| Properties of latex | | | | | | | |
| Total acid group Content (meq.) | 1.07 | 1.51 | 1.02 | 0.46 | 0.02 | 3.25 | 2.44 |
| Properties of dip-formed article | | | | | | | |
| Feeling (kg/cm$^2$) | 46 | 38 | 52 | 30 | 10 | 100 | 82 |
| Tensile strength (kg/cm$^2$) | 360 | 310 | 370 | 250 | 60 | 540 | 480 |
| Tensile strength after Water immersion (kg/cm$^2$) | 250 | 200 | 260 | 240 | 51 | 90 | 120 |

EXAMPLES 5–10

The procedures for preparing copolymer latex A, described in Example 1, were repeated wherein the monomer composition was varied as shown in Table 2 with all other conditions remaining the same. Thus copolymer latexes H through M were prepared. The adjusted pH value of latex M was 5.6.

The total acid group contents of latexes H to M are in the range of 0.15 to 1.8 meq. CS1 values and CS2 values of latexes H to M were measured. The results are shown in Table 2.

By the same procedures as described in Example 1, dip-formed articles were made wherein latexes H through M were used instead of latex A, and 7 parts of the liquid dispersion of vulcanizer having a solid concentration of 50% was used which was prepared by mixing 1.0 part of sulfur, 1.5 parts of zinc oxide, 0.7 part of titanium oxide, 0.03 part of potassium hydroxide and 3.2 part of water. The evaluation results of the dip-formed articles are shown in Table 2.

TABLE 2

| Example No. | Example | | | | | |
|---|---|---|---|---|---|---|
| | 5 | 6 | 7 | 8 | 9 | 10 |
| Monomers (parts) | | | | | | |
| Acrylonitrile | 35 | 45 | 35 | 40 | 20 | 30 |
| 1,3-Butadiene | 50 | 50 | 63 | 57 | 70 | 60 |
| Methacrylic acid | 15 | 5 | 2 | 3 | 10 | 10 |
| Latex | H | I | J | K | L | M |
| Properties of latex | | | | | | |
| CS1 value (%) | 2.7 | 2.3 | 2.2 | 1.4 | 3.3 | 1.9 |
| CS2 value (%) | 2.2 | 1.7 | 1.5 | 0.6 | 2.5 | 1.2 |
| Properties of dip-formed article | | | | | | |
| Film forming | a | a | a | c | b | c |

TABLE 2-continued

| Example No. | Example | | | | | |
|---|---|---|---|---|---|---|
| | 5 | 6 | 7 | 8 | 9 | 10 |
| property | | | | | | |
| Film thickness (mm) | 0.2 | 0.26 | 0.29 | 0.45 | 0.18 | 0.32 |
| Monodisperse ratio of film thickness (%) | 6 | 4.5 | 3.8 | 2.8 | 12.2 | 3.5 |
| Feeling (kg/cm$^2$) | 60 | 44 | 38 | 40 | 54 | 57 |
| Tensile strength (kg/cm$^2$) | 420 | 340 | 300 | 310 | 390 | 400 |
| Oil resistance, JIS #3 oil | 2 | 0 | 2 | 2 | 3 | 2 |
| Cuttlefish oil | 11 | 4 | 12 | 12 | 12 | 11 |
| Gasoline | 23 | 12 | 22 | 21 | 26 | 23 |

From the results shown in Table 2, dip-formed articles made from copolymer latexes H to J having a CS1 value of not larger than 3.0% and a CS2 value of at least 1.5% in Examples 5 to 7 have an excellent uniform-film-forming property. Dip-formed articles made from copolymer latexes K and M having a CS2 value of smaller than 1.5% have poor uniform-film-forming property, and, to make a dip-formed article having good uniform-film-forming property, it was necessary to use a larger amount of latex (Examples 8 and 10). A dip-formed article made from copolymer latex L having a CS1 value of larger than 3.0% has somewhat poor uniform-film-forming property, and, to make a dip-formed article having good uniform-film-forming property, it was necessary to use a larger amount of latex (Example 9).

EXAMPLES 11–16

The procedures for preparing copolymer latex A, described in Example 1, were repeated wherein the monomer composition was varied as shown in Table 3 to prepare copolymer latexes N through T. In these Examples, 0.5 part of an antioxidant, shown in Table 3, was added to 100 parts (as solid content) of latex with all other conditions remaining the same. By substantially the same procedures as described in Example 1, dip-formed articles were made from the antioxidant-added latexes instead of latex A.

The antioxidant was added as a dispersion which was prepared by the emulsifying method or the pulverization method using a bead mill. In the pulverization method using a bead mill, a ring mill dispersion mixer (RG-100 available from Araki Tekko K.K.) charged with zirconia beads having a diameter of 0.5 mm (charged amount: 80% of the volume of mill) was used. The emulsifying method was carried out at 55° C. by using a TK homomixer (type 4D, available from Tokushuki Kakogyo K.K.). Thus an antioxidant dispersion having a solid concentration of 50% was prepared.

Properties of the resultant dip-formed articles were evaluated. The results are shown in Table 3. All of the dip-formed articles exhibited excellent uniform-film-forming property, a soft feeling, high tensile strength, and high tensile strength after immersion in water.

As seen from the results shown in Table 3, when a phenolic compound is added, the obtained dip-formed articles exhibit good heat discoloration resistance, light discoloration resistance and pinking resistance (Examples 11 to 13). When an aromatic amine compound is added, the obtained dip-formed articles exhibit good heat discoloration resistance and light discoloration resistance, but the pinking resistance is somewhat poor (Examples 14 and 15). When a dithiocarbamic acid salt having a function of peroxide decomposition is added, the heat discoloration resistance, light discoloration resistance and pinking resistance of the dip-formed article are inferior to those of the dip-formed articles obtained with a phenolic compound (Example 16).

TABLE 3

| | Example | | | | | |
|---|---|---|---|---|---|---|
| Example No. | 11 | 12 | 13 | 14 | 15 | 16 |
| Monomers (parts) | | | | | | |
| Acrylonitrile | 23 | — | 45 | — | 34 | 20 |
| Styrene | — | 44 | — | 42 | — | — |
| 1,3-Butadiene | 65 | 50 | 53 | 56 | 59 | 68 |
| Methacrylic acid | 12 | 6 | 2 | 2 | 7 | 12 |
| Latex | N | P | Q | R | S | T |

TABLE 3-continued

| | Example | | | | | |
|---|---|---|---|---|---|---|
| Example No. | 11 | 12 | 13 | 14 | 15 | 16 |
| Antioxidant | Ph *1 | Ph *2 | Ph *3 | Amine *4 | Amine *5 | NDTCM *6 |
| Melting point (° C.) | 172 | 115 | <30 | 44 | 225 | 85 |
| Method of dispersion *7 | Bead mill | Bead mill | Emulsion | Emulsion | Bead mill | Bead mill |
| Properties of dip-formed article | | | | | | |
| Heat discoloration Resistance | 56.8 | 55.2 | 55.7 | 55.4 | 55.9 | 65.3 |
| Light discoloration resistance | 52.7 | 50.9 | 51.2 | 50.3 | 51.9 | 60.2 |
| Pinking resistance | 0.18 | 0.10 | 0.12 | 3.21 | 3.12 | 2.10 |

Note, Antioxidant
Ph *1: 2,5-di-t-amylhydroquinone
Ph *2: Butylated reaction product of p-cresol with dicyclopentadiene
Ph *3: Butylated nonylated phenol
Amine *4: N-phenyl-N'-(1,3-dimethylbutyl)-p-phenylenediamine
Amine *5: N,N'-di-2-naphthyl-p-phenylenediamine
NDTCM *6: Nickel dithiocarbamate
Method of dispersion *7:
Bead mill: Pulverization method using a bead mill
Emulsion: Emulsifying method

INDUSTRIAL APPLICABILITY

According to the present invention, a dip-formed article having no fear of development of an allergy to protein, and exhibiting a soft feeling and a high mechanical strength can be obtained. Further, a latex for dip forming is provided which is used for making the dip-formed article.

What is claimed is:

1. A latex for dip forming characterized in that the latex comprises a copolymer prepared by copolymerizing 10 to 90% by weight of a conjugated diene monomer, 0.1 to 20% by weight of an ethylenically unsaturated acid monomer and 10 to 89.9% by weight of other ethylenically unsaturated monomer or monomers copolymerizable therewith, wherein the sum of the amount of acid groups bonded to or adsorbed on the surface of the copolymer constituting the latex and the amount of acid groups present in the aqueous phase of the copolymer latex is in the range of 0.1 to 2 milli-equivalent in terms of hydrochloric acid, per gram of the copolymer wherein the latex for dip forming contains 0.1 to 3 parts by weight of a phenolic antioxidant, based on 100 parts by weight of the solid content in the copolymer latex.

2. The latex for dip forming according to claim 1, wherein the ethylenically unsaturated acid monomer is an ethylenically unsaturated monocarboxylic acid monomer.

3. The latex for dip forming according to claim 1, wherein said other ethylenically unsaturated monomer or monomers comprises at least one monomer selected from the group consisting of ethylenically unsaturated nitrile monomers and aromatic vinyl monomers.

4. The latex for dip forming according to claim 1, wherein the copolymer latex has chemical stability index values satisfying the following formulae (1):

$$1.5\% \leq CS2, \text{ and } CS1 \leq 3.0\% \tag{1}$$

5. The latex for dip forming according to claim 1, wherein the antioxidant is solid at room temperature and has a melting point which is lower than the highest temperature to which the copolymer is exposed in the course of producing a dip-formed article.

6. The latex for dip forming according to claim 1, wherein the antioxidant has been pulverized by a high-speed bead mill.

7. A dip-formed article which is made by dip-forming the latex as claimed in claim 1.

8. A thin-gage glove which is made by dip-forming the latex as claimed in claim 1.

* * * * *